July 26, 1955 N. POFFENBERGER 2,714,056
METHOD OF OPERATING MIXER-SETTLER EXTRACTORS
Filed Oct. 20, 1952 3 Sheets-Sheet 2

INVENTOR.
Noland Poffenberger
BY
Griswold & Burdick
ATTORNEYS

July 26, 1955  N. POFFENBERGER  2,714,056
METHOD OF OPERATING MIXER-SETTLER EXTRACTORS
Filed Oct. 20, 1952  3 Sheets-Sheet 3

INVENTOR.
Noland Poffenberger
BY
Griswold & Burdick
ATTORNEYS

United States Patent Office 2,714,056
Patented July 26, 1955

2,714,056

METHOD OF OPERATING MIXER-SETTLER EXTRACTORS

Noland Poffenberger, Midland, Mich., assignor to The Dow Chemical Company, Midland, Mich., a corporation of Delaware Application October 20, 1952, Serial No. 315,761

3 Claims. (Cl. 23—310)

This invention relates to a new and improved method of operating mixer-settler extractors. It relates particularly to the operation of vertical, multistage extractors having terminal settling zones and intervening alternate mixing and settling zones.

It has been recognized that the efficiency of an extractor can be maintained at a high level if the dispersed droplets can be redispersed almost as rapidly as they coalesce. To accomplish this result, extractors have been developed in which the discontinuous phase is collected at intervals along the column and is redispersed into the continuous phase. There are many known modifications of such mixer-settler extractors. In the operation of such extractors, a large part of the mass transfer from one liquid phase to the other occurs during formation of the droplets of the disperse phase. It is of importance, then, that the droplets be as fine as possible and that the two phases be allowed to separate periodically, as completely as possible.

The conventional method of operating mixer-settler extractors is to establish a rate of flow for the heavy liquid introduced at one end and the same or a different rate for the light liquid introduced at the other end. These rates are maintained as the liquids flow in countercurrent liquid-liquid contact through successive settling and mixing zones, with an extract being withdrawn from one end of the system and a raffinate from the other. As the liquids enter a mixing zone, at their respective normal rates of flow, they are subjected to agitation in such zone, whereupon one phase becomes redispersed in the other. The mixed liquids are displaced to the adjacent settling zones, where the phases separate into two distinct layers. The lighter liquid flows upward and the heavier liquid flows downward into the next mixing zones. The volume of material entering and leaving each mixing zone in a given time interval is equal to or not much different from the sum of the volumes of the two liquids fed to the extractor in that time interval. The liquids are mixed once in passing through each mixing zone, and are separated once in their passage through each settling zone. The settling zones are usually quite large and in normal operation a static liquid-liquid interface is maintained in each settling zone.

It is the principal object of the present invention to provide an improved method of operating mixer-settler extractors such that only a small volume of the disperse phase layers out in each settling zone. A particular object is to provide such a method in which control of only a single liquid-liquid interface is required in the system. A related object is to provide such a method of operation whereby there is obtained a close approach to equilibrium between the counterflowing liquids at each extraction stage. Other and related objects may appear hereinafter.

In the method of the present invention, the heavy liquid, herein sometimes designated H, is introduced near the top and the light liquid, sometimes designated L, substantially immiscible with H, is introduced near the bottom of a vertical mixer-settler extractor in the usual way. The extractor has a top and a bottom settling section and has alternate mixing and settling sections therebetween. The volumetric rate of flow of the heavy liquid may be designated $F_H$ and that of the light liquid $F_L$. One of these rates is so adjusted, relative to the other, as to maintain a single continuous interface across the extractor at a preselected settling zone. There is continuously removed from the bottom of the extractor the heavy liquid at a rate $F_{H \pm x}$ and from the top of the extractor the light liquid at a rate $F_{L \mp x}$, where X is a variable which represents the total volume change of each phase due to liquid-liquid interchange during their passage through the extractor. A single symbol X is here used to designate the volume changes, though it is recognized that the changes in volume of the two phases may not be identical.

The present method departs from prior standard practice by controlling the circulation of H and L into, through and out of the mixing zones in a particular manner. Thus, there is circulated into a given mixing zone N from the next higher settling zone $(N+1)$, in unit time, an amount of H significantly greater than either of the rates $F_H$ or $F_{H \pm x}$. There is circulated simultaneously into the same mixing zone N, from the next lower settling zone $(N-1)$, an amount of L significantly greater than either of the rates $F_L$ or $F_{L \mp x}$. Each of the liquids H and L is introduced into zone N through interzonal passages (which may conveniently be near the vertical axis of the extractor) of such small size that the velocity of each stream to the mixing zone prevents counterflow of the other liquid phase therethrough. The two phases, H and L, are mixed in zone N and the mixed liquids are impelled away from their points of entry toward other restricted interzonal passages distant from any point of entry of liquid to zone N. Thus, when H and L enter zone N near the axis of the extractor, the mixed liquids are impelled toward other interzonal passages near the periphery of the extractor. A portion of the mixing liquids is displaced upwardly through said distant interzonal passages to the next higher settling zone $(N+1)$ and the remainder of the mixed liquids is displaced downwardly through such passages into the next lower settling zone $(N-1)$. The velocities of the so-displaced portions of the mixed liquids are kept high enough to prevent counterflow of settled liquid through the said distant passages to the mixing zone from the adjacent settling zones. The same operations are repeated at each mixing zone in the extractor.

In the present method, then, there is the usual overall rate of flow of each phase, but there is much greater and more frequent contact between the two phases. This is made possible by the rapid circulation of a portion of each settled phase into its adjacent mixing zone and back to the settling zones. In the interval in which one volume of either liquid is fed to or discharged from the extractor, from 2 to 10 volumes or more of each phase may be drawn into and discharged from each mixing zone. This means that one phase is collected and redispersed as droplets through the other phase from 2 to 10 or more times as often as would occur if the two liquids were only mixed in the conventional manner at about the rates at which they flow through the system.

Any of several extractor structures may be used in carrying out the method of the invention. These may have internal or external mixing zones, as may be desired. While the apparatus used forms no part of the present invention, the method may be understood by reference to the annexed drawing wherein Figs. 1, 2 and 5 are schematic views of vertical sections through three modifications of apparatus in which the method may be carried out;

Figure 5:
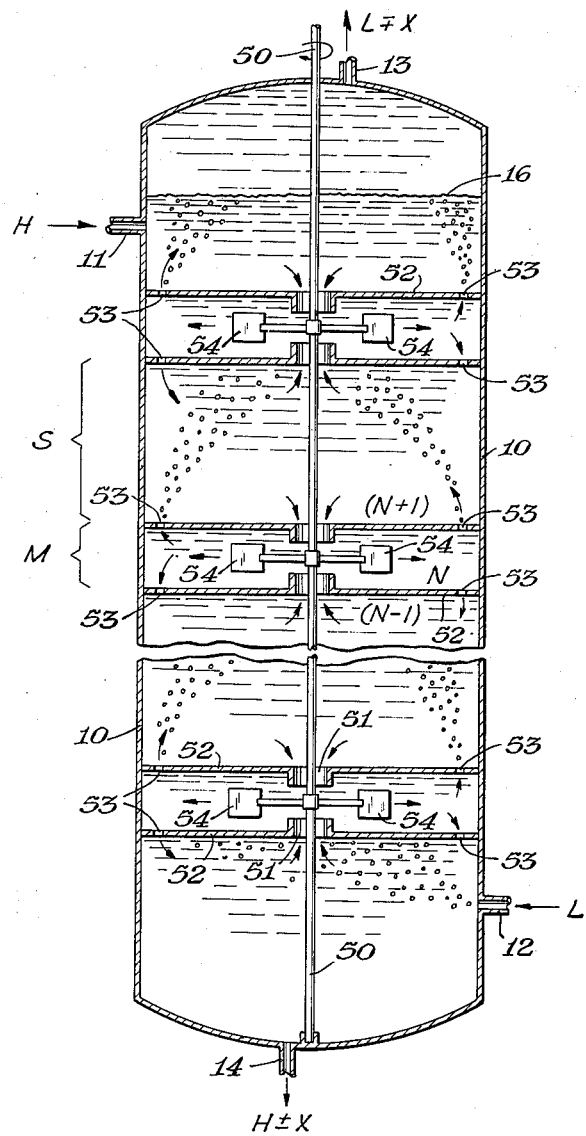

(Apparatus of the type illustrated in Fig. 5 is the subject of a concurrently filed application of the same inventor, Serial No. 315,762, now Patent No. 2,665,196.)

Figure 1:
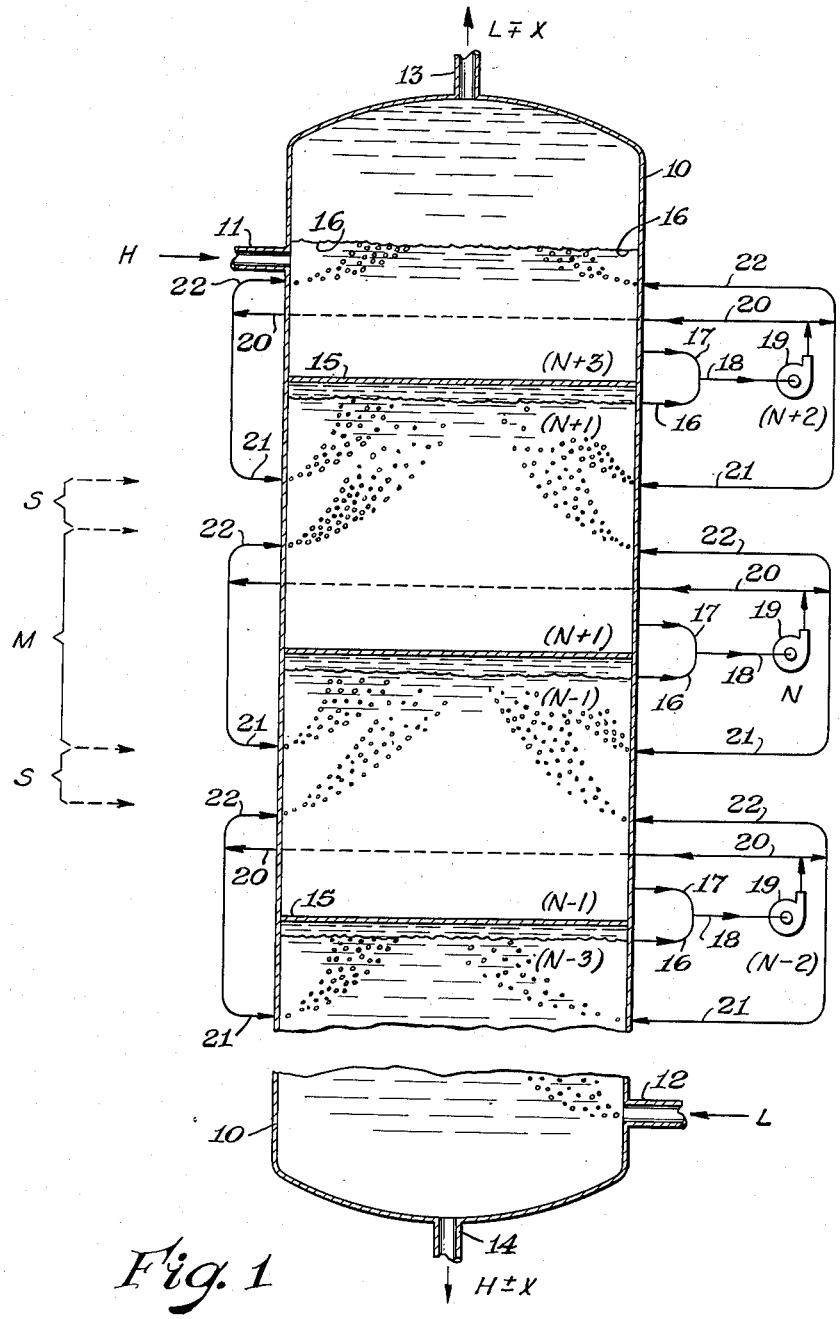

Fig. 1 illustrates a vertical cylindrical tower 10 having an inlet 11 near the top for heavy liquid feed H and an inlet 12 near the bottom for relatively light liquid feed L, substantially immiscible with H. Tower 10 is also provided with an outlet 13 at the top for the light liquid phase $L \mp X$ and an outlet 14 at the bottom for the heavy liquid phase $L \pm X$. Several imperforate plates 15, disposed horizontally, divide tower 10 into a series of compartments. As illustrated, the light liquid L is the disperse phase, and the heavy liquid H is the continuous phase. The rates of flow, $F_H$ and $F_L$ are adjusted so as to maintain a single undisturbed interface 16, illustrated here as being in the top compartment of tower 10. Interface 16 may, of course, be maintained at any desired level. Below the level of interface 16, the continuous phase is the heavy liquid, while above interface 16, the continuous phase is the light liquid. The light liquid L, entering through port 12, breaks up into droplets which rise through the continuous phase H and are trapped against the lower side of a baffle plate 15, where they coalesce. Most of the settled light phase and possibly some of the heavy phase is withdrawn from beneath plate 15 through pipe 16 while some of the continuous phase from above plate 15 is withdrawn through pipe 17. The two streams are merged in pipe 18 and the liquids are mixed thoroughly, as in centrifugal pump 19. The mixed liquids are discharged from pump 19 through pipe 20 from which they flow in part through one or more pipes 21 to the compartment below plate 15 and in part through one or more pipes 22 to the compartment above plate 15. The separation process is resumed, and the mixing and redistribution operations are repeated at each compartment in tower 10.

Assume that the compartments and communicating pumps are numbered from the bottom to the top of tower 10, thus: 1, 2, 3, ... $(N-1)$, N, $(N+1)$ ... etc., with alternate numbers in the series designating the mixing pumps. Then, at any mixing zone N there is mixed a stream of predominantly light liquid from zone $(N-1)$ and a stream of predominantly heavy liquid from zone $(N+1)$, and the so-mixed liquids are discharged to settling zones $(N-1)$ and $(N+1)$. In each case, the velocity of flow of predominantly light liquid through pipe 16 must be great enough to prevent counterflow of heavy liquid from pipe 17 through pipe 16. Similarly, the velocity of liquid in pipe 17 must be such as to prevent counterflow of liquid from pipe 16 through pipe 17. In like manner, the velocity of the mixed liquids in pipes 21 and 22 must be great enough to prevent counterflow of settled liquids from tower 10 back into those pipes. These conditions can be achieved by maintaining the combined flows of the two phases through pump 19 and pipe 20 greater than the sum of $F_H$ and $F_L$ or of $F_{H \pm X}$ and $F_{L \mp X}$, and by suitable throttle valves, not shown, in pipes 16, 17, 21 and 22. In this manner, each portion of H and each portion of L passes several times through a mixing zone N before moving on to zone $(N-2)$, in the case of liquid H, or to zone $(N+2)$, in the case of liquid L. Sections of the system like that marked M may be considered to be mixing zones with considerable recirculation, while sections of the system like those marked S may be deemed to be the settling sections, though settling actually occurs over a somewhat wider range in each compartment.

Figure 3:
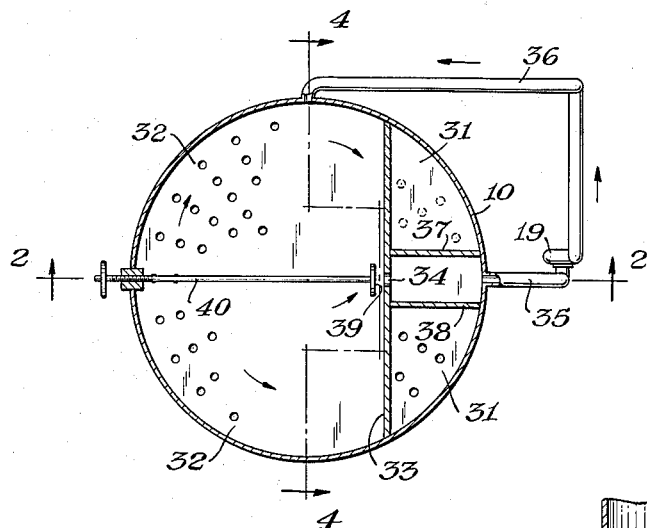
Fig. 3 is a plan, taken along line 3—3 of Fig. 2.
Figure 4:
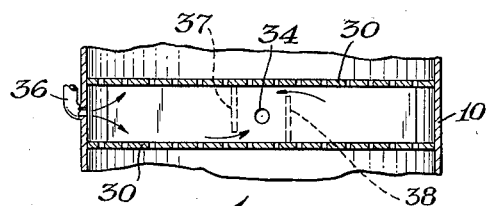
Fig. 4 is a vertical section through one chamber of the apparatus, taken along line 4—4 of Fig. 3.
Figure 2:
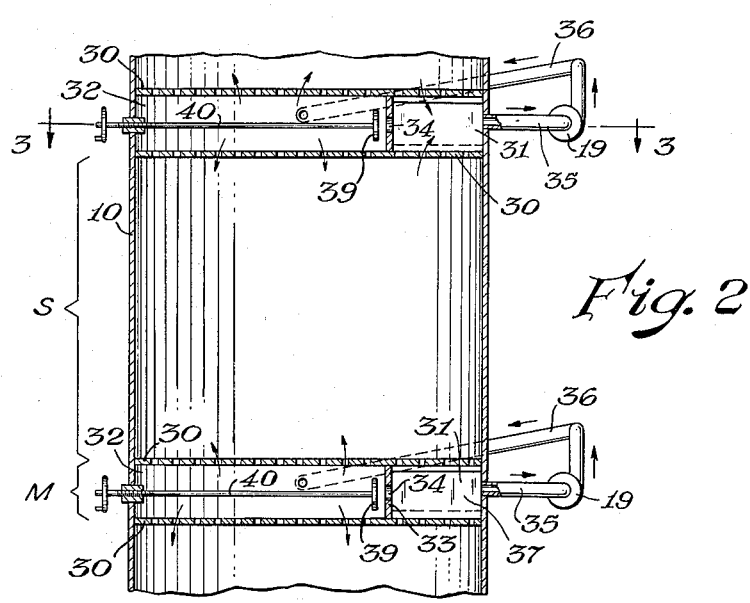

Another suitable apparatus is illustrated in Figs. 2, 3 and 4. In this instance, the upright cylindrical tower 10, instead of having the imperforate plates 15 of Fig. 1, is provided with spaced pairs of perforate plates 30. The space between each pair of perforate plates 30 is divided into two unequal compartments 31, 32 by means of a vertical partition 3, having a centrally disposed orifice 34 therethrough for flow of liquids from compartment 32 to compartment 31. The smaller compartment 31 communicates through pipe 35 with the suction side of a mixing pump 19, while the larger compartment 32 communicates through pipe 36 with the discharge side of pump 19. The perforations in plates 30, especially in the areas adjacent chamber 31, are quite small, and the velocities of the liquids drawn through chamber 31 to the pump 19 and discharged from the pump 19 to chamber 32 are kept high enough to prevent counterflow of the two liquid phases through chambers 31 and 32. The possibility of the liquids bypassing the mixing pump 19 may be reduced further by mounting vertical baffles 37 and 38 at right angles to partition 33 in chamber 31, one suspended from the upper member of the pair of perforated plates 30 and the other mounted on the lower plate of the pair, each baffle 37 and 38 extending over half, but not all, of the distance between plates 30. The flow of liquids through orifice 34 in partition 33 between chambers 32 and 31 may be controlled to provide any desired amount of recycling of fluids to the pump by advancing toward or withdrawing from orifice 34 a valve diaphragm 39 which may be mounted conveniently on valve stem 40. In operation, the light liquid rises through the heavy liquid in a settling zone S and comes to rest against the bottom plane of a perforate plate 30. Owing to the velocity at which mixed liquids pass down through the small perforations, the light liquid cannot flow against those liquids into chamber 32. Instead, it is drawn into chamber 31 from below and thence into pipe 35. At the same time, heavy liquid which has settled on the upper plane of the other member of a pair of perforate plates 30 cannot flow against the mixed liquids discharged from chamber 32, and is drawn into chamber 31 from above, and thence into pipe 35. The two liquids are mixed in pump 19 and discharged therefrom at high velocity into chamber 32, from which a small portion of the mixed liquids is displaced to higher and lower settling zones to prevent counterflow of the settled liquids on the opposite sides of plates 30, while the larger remaining portion of the mixed liquids is drawn through orifice 34 into chamber 31 and again into the mixing pump.

Fig. 5 illustrates another type of apparatus in which the method of the present invention may be carried out. In this figure of the drawings, a vertical cylindrical tower 10 is provided with the same inlets 11, 12 and outlets 13, 14 as are shown in Fig. 1, and, assuming the light liquid to be the disperse phase, the flows of the two liquids are so-adjusted as to maintain a single undisturbed interface 16 above the level of inlet 11 in the uppermost compartment. A rotor shaft 50 is mounted in the vertical axis of tower 10, passing with adequate clearance for the flow of liquids through central ports 51 in a series of spaced pairs of transverse plates 52. Near the periphery of each plate 52, interzonal passages 43 are provided through or around the edges of plates 52. In a preferred arrangement, the members of each pair of plates 52 are closer to one another than either of them is to the closest member of the next pair. Impellers 54 are mounted radially about shaft 50 for rotation therewith, in alternate compartments, between pairs of plates 52. The compartments containing the impellers 54 constitute the mixing zones and the adjacent compartments are the settling zones in this internal mixer-settler extractor. In operation, shaft 50 is rotated by an external drive (not shown). Settled light liquid is drawn from the under side of the lower member of a pair of plates 52 through a suction port 51 into a mixing chamber while settled heavy liquid is drawn from the upper side of the upper member of a pair of plates 52 through a similar port 51. The two liquids are mixed and are thrust radially outward in the mixing zone due to the action of the impellers 54. The so-mixed liquids are forced into adjoining settling zones through the interzonal passages 53. Ports 51 are small enough, and the action of the impellers is made great enough so that the light liquid from one settling zone $(N-1)$ cannot flow through port 51, thence along shaft 50 through a mixing zone N, and another port 51 into settling zone $(N+1)$. Neither can heavy liquid from a settling zone $(N+1)$ flow down around shaft 50 through two successive ports 51 into settling zone $(N-1)$. Instead, the velocity of each liquid through its closest port 51 into the suction side of the mixing zone is great enough to prevent counterflow of the other liquid. Similarly, the peripherally disposed interzonal passages 53 are small enough so that the velocity of the mixed liquids passing therethrough from a mixing zone to the adjoining settling zones prevents counterflow of settled liquid from either settling zone into a mixing zone through those passages 53. The volume of mixed liquids passing through any mixing zone in unit time is substantially greater than the sum of $F_H$ and $F_L$ or the sum of $F_{H\pm x}$ and $F_{L\mp x}$. Each particle of the disperse phase is thus caused to coalesce with other particles and then to be redispersed several times more than would be the case if the flow through the mixing zones were limited in the usual way to the overall flow through the system. Hence, there is obtained a closer approach to equilibrium between the two liquids in each stage than is possible when following the prior standard practice.

Many types of apparatus can be employed to carry out the method of the invention in addition to those specifically shown herein.

I claim:

1. The method which comprises introducing heavy liquid H near the top and light liquid L substantially immiscible therewith near the bottom of a vertical mixer-settler extractor, having alternate mixing and settling zones throughout its length, at volumetric rates of flow $F_H$ for the heavy liquid and $F_L$ for the light liquid in the zones to which they are fed initially, and withdrawing heavy liquid at a rate $F_{H\pm x}$ from the bottom and light liquid at a rate $F_{L\mp x}$ from the top of the column, X being a variable representing the total volume change of each phase due to liquid-liquid interchange between phases in their passage through the extractor; regulating one of the flows $F_H$ and $F_L$ so as to maintain a single continuous interface across the extractor at a preselected settling zone; circulating into a given mixing zone N from the next higher settling zone $(N+1)$ an amount of the heavy liquid significantly greater than either of the rates $F_H$ and $F_{H\pm x}$, while circulating into said mixing zone N from the next lower settling zone $(N-1)$ an amount of the light liquid significantly greater than either of the rates $F_L$ and $F_{L\mp x}$, each liquid H and L being introduced into zone N through interzonal passages of such small size that the velocity of each stream to the mixing zone prevents counterflow therethrough of the other liquid phase; mixing in zone N the stream of liquid H from zone $(N+1)$ and the stream of liquid L from zone $(N-1)$; impelling the mixed liquids toward other restricted interzonal passages distant from any point of entry of liquids to zone N; and displacing a portion of the mixed liquids upwardly through such passages from zone N to zone $(N+1)$ and the remainder of the mixed liquids downwardly through such passages from zone N to zone $(N-1)$, the velocities of the so-displaced portions of the mixed liquids each being such as to prevent counterflow of settled liquid through the last said passages from the adjacent settling zones.

2. The method which comprises introducing heavy liquid H near the top and light liquid L substantially immiscible therewith near the bottom of a vertical multistage mixer-settler extractor, having terminal settling zones and alternate mixing and settling zones throughout its length, at volumetric rates of flow $F_H$ for the heavy liquid and $F_L$ for the light liquid in the zones to which they are fed initially, and withdrawing heavy liquid at a rate $F_{H\pm x}$ from the bottom and light liquid at a rate $F_{L\mp x}$ from the top of the column, X being a variable representing the total volume change of each phase due to liquid-liquid interchange between phases in their passage through the extractor; regulating one of the flows $F_H$ and $F_L$ so as to maintain a single continuous interface across the extractor at a preselected settling zone; circulating into a given mixing zone N from the next higher settling zone $(N+1)$ an amount of the heavy liquid significantly greater than either of the rates $F_H$ and $F_{H\pm x}$, while circulating into said mixing zone N from the next lower settling zone $(N-1)$ an amount of the light liquid significantly greater than either of the rate $F_L$ and $F_{L\mp x}$, each liquid H and L being introduced into zone N through interzonal passages of such small size that the velocity of each stream to the mixing zone prevents counterflow therethrough of the other liquid phase; mixing in zone N the stream of liquid H from zone $(N+1)$ and the stream of liquid L from zone $(N-1)$; impelling the mixed liquids toward other restricted interzonal passages distant from any point of entry of liquids to zone N; displacing a portion of the mixed liquids upwardly through such passages from zone N to zone $(N+1)$ and the remainder of the mixed liquids downwardly through such passages from zone N to zone $(N-1)$, the velocities of the so-displaced portions of the mixed liquids each being such as to prevent counterflow of settled liquid through the last said passages from the adjacent settling zones; and repeating these operations at each mixing zone in the extractor.

3. The method which comprises introducing heavy liquid H near the top and light liquid L substantially immiscible therewith near the bottom of a vertical multistage mixer-settler extractor, having terminal settling zones and alternate mixing and settling zones throughout its length, at volumetric rates of flow $F_H$ for the heavy liquid and $F_L$ for the light liquid in the zones to which they are fed initially, and withdrawing heavy liquid at a rate $F_{H\pm x}$ from the bottom and light liquid at a rate $F_{L\mp x}$ from the top of the column, X being a variable representing the total volume change of each phase due to liquid-liquid interchange between phases in their passage through the extractor; regulating one of the flows $F_H$ and $F_L$ so as to maintain a single continuous interface across the extractor at a preselected settling zone; circulating into a given mixing zone N from the next higher settling zone $(N+1)$ an amount of the heavy liquid significantly greater than either of the rates $F_H$ and $F_{H\pm x}$, while circulating into said mixing zone N from the next lower settling zone $(N-1)$ an amount of the light liquid significantly greater than either of the rates $F_L$ and $F_{L\mp x}$, each liquid H and L being introduced into zone N through interzonal passages located near the vertical axis of the extractor and of such small size that the velocity of each stream to the mixing zone prevents counterflow therethrough of the other liquid phase; mixing in zone N the stream of liquid H from zone $(N-1)$ and the stream of liquid L from zone $(N-1)$; impelling the mixed liquids toward other restricted interzonal passages near the periphery of zone N; displacing a portion of the mixed liquids upwardly through such passages from zone N to zone $(N+1)$ and the remainder of the mixed liquids downwardly through such passages from zone N to zone $(N-1)$, the velocities of the so-displaced portions of the mixed liquids each being such as to prevent counterflow of settled liquid through the last said passages from the adjacent settling zones; and repeating these operations at each mixing zone in the extractor.

References Cited in the file of this patent

UNITED STATES PATENTS

| | | |
|---|---|---|
| 2,009,347 | Sheldon | July 23, 1935 |
| 2,084,342 | Houghton | June 22, 1937 |
| 2,091,645 | McConnell | Aug. 31, 1937 |
| 2,569,391 | Stearns | Sept. 25, 1951 |
| 2,599,836 | Johnson | June 10, 1952 |